(12) United States Patent
Cheng

(10) Patent No.: US 12,320,905 B2
(45) Date of Patent: Jun. 3, 2025

(54) DETECTING GNSS SIGNAL LOCK

(71) Applicant: u-blox AG, Thalwil (CH)

(72) Inventor: Zhenlan Cheng, Thalwil (CH)

(73) Assignee: u-blox AG, Thalwil (CH)

( * ) Notice: Subject to any disclaimer, the term of this patent is extended or adjusted under 35 U.S.C. 154(b) by 155 days.

(21) Appl. No.: 18/156,150

(22) Filed: Jan. 18, 2023

(65) Prior Publication Data

US 2023/0266477 A1    Aug. 24, 2023

(30) Foreign Application Priority Data

Jan. 19, 2022    (EP) ........................ 22152278

(51) Int. Cl.
   *G01S 19/00*    (2010.01)
   *G01S 19/07*    (2010.01)
   *G01S 19/25*    (2010.01)
   *G01S 19/29*    (2010.01)

(52) U.S. Cl.
   CPC .............. *G01S 19/29* (2013.01); *G01S 19/07* (2013.01); *G01S 19/256* (2013.01)

(58) Field of Classification Search
   CPC ......... G01S 19/29; G01S 19/07; G01S 19/256
   See application file for complete search history.

(56) References Cited

U.S. PATENT DOCUMENTS

| 6,272,313 | B1 | 8/2001 | Arsenault et al. | |
| 11,536,852 | B2 * | 12/2022 | Cheng | G01S 19/23 |
| 2007/0046536 | A1 | 3/2007 | Jia et al. | |
| 2008/0317101 | A1 * | 12/2008 | Yu | G01S 19/24 |
| | | | | 375/E1.018 |
| 2013/0169479 | A1 * | 7/2013 | Lennen | G01S 19/30 |
| | | | | 342/357.68 |
| 2015/0372773 | A1 * | 12/2015 | Hammes | H03L 7/08 |
| | | | | 375/224 |
| 2021/0149059 | A1 * | 5/2021 | Wang | G01S 19/37 |
| 2023/0213658 | A1 * | 7/2023 | Yu | H04L 25/0222 |
| | | | | 342/352 |

OTHER PUBLICATIONS

Extended European Search Report in European Appln. No. 22152278.2, mailed on Jul. 15, 2022, 7 pages.
Extended European Search Report in European Appln. No. 23152181.6, mailed on Jun. 14, 2023, 5 pages.

* cited by examiner

*Primary Examiner* — Khai M Nguyen

(74) *Attorney, Agent, or Firm* — Fish & Richardson P.C.

(57) ABSTRACT

A method and apparatus are provided for detecting GNSS signal lock. An example method includes tracking a plurality of signals received from a respective plurality of satellites in the GNSS, and calculating an individual frequency spectrum for each tracked signal in the plurality, to produce a plurality of individual frequency spectra. The example method further includes combining one or more values from several of the individual frequency spectra, to produce one or more combined values; and detecting an ensemble signal lock condition based at least in part on the one or more combined values.

15 Claims, 5 Drawing Sheets

DETECTING GNSS SIGNAL LOCK

CROSS-REFERENCE TO RELATED APPLICATIONS

This application claims the benefit of priority to European Application No. 22152278.2, filed on Jan. 19, 2022, the contents of which are hereby incorporated by reference.

FIELD OF THE INVENTION

The present invention relates to Global Navigation Satellite Systems (GNSS). In particular, it relates to a method and apparatus for detecting signal lock for signals received from a GNSS.

BACKGROUND OF THE INVENTION

Techniques for GNSS positioning are well known in the art. Existing GNSS include the Global Positioning System (GPS), Galileo, GLONASS, and BeiDou Navigation Satellite System (BDS), also referred to herein as simply "BeiDou". Each GNSS comprises a constellation of satellites, also known in the art as "space vehicles" (SVs), which orbit the earth. Typically, each SV transmits a number of satellite signals. These are received by a GNSS receiver whose position it is desired to calculate. The GNSS receiver can make a number of ranging measurements using the signals, to derive information about the distance between the receiver and respective satellites. When a sufficient number of measurements can be made, the receiver's position can then be calculated by multilateration.

Once a GNSS receiver has acquired satellite signals, it tracks those signals—typically via one or more tracking loops—in order to continually make ranging measurements, at successive epochs. The tracking parameters may include the code phase, carrier phase, frequency, and rate of change of frequency of each acquired satellite signal, as observed by the GNSS receiver. The code phase and carrier phase measurements are used for the multilateration solution. The frequency measurements are used for calculating the velocity of the GNSS receiver; and the rate of change of each frequency is used for calculating the acceleration of the receiver.

An accurate position, velocity, and time (PVT) solution depends on accurate tracking of the satellite signal parameters. However, signal lock may be lost, meaning that a tracking loop ceases to accurately track a satellite signal. A tracking loop will output tracking parameters even when it has lost lock on the satellite signal. Essentially, the tracking loop is then tracking noise- or at least producing tracking parameters that are inaccurate, because they are corrupted by noise. Obviously, this has the potential to corrupt the PVT solution. Therefore, it is desirable to detect a signal lock condition (and conversely a loss of signal lock) in order to determine whether a PVT solution is reliable or not.

SUMMARY OF THE INVENTION

It would be desirable to provide an accurate way of detecting a signal lock condition. On the one hand, it is important not to output a corrupted PVT solution, caused by a loss of signal lock. On the other hand, if the detection of the signal lock condition is too conservative, then the system may erroneously discard a valid PVT solution.

A method and apparatus are provided for detecting GNSS signal lock. The method comprises tracking a plurality of signals received from a respective plurality of satellites in the GNSS, and calculating an individual frequency spectrum for each tracked signal in the plurality, to produce a plurality of individual frequency spectra. The method further comprises combining one or more values from several of the individual frequency spectra, to produce one or more combined values; and detecting an ensemble signal lock condition based at least in part on the one or more combined values.

In one aspect (not according to the presently claimed invention), there is provided a method of detecting an ensemble signal lock condition for an ensemble of signals, the method comprising:
  tracking a plurality of received signals;
  calculating an individual frequency spectrum for each tracked signal in the plurality, to produce a plurality of individual frequency spectra, each individual frequency spectrum comprising a plurality of values;
  combining one or more values from several of the individual frequency spectra, to produce one or more combined values; and
  detecting the signal lock condition based at least in part on the one or more combined values.

The ensemble of signals may be received concurrently. In particular, they may be received from a global navigation satellite system, hereinafter GNSS. The plurality of signals may be received from a respective plurality of transmitters and/or antennas. The transmitters may be SVs in a GNSS.

Consequently, according to an aspect of the present invention there is provided a method of detecting an ensemble signal lock condition for signals received from a global navigation satellite system, hereinafter GNSS, the method comprising:
  tracking a plurality of signals received from a respective plurality of satellites in the GNSS;
  calculating an individual frequency spectrum for each tracked signal in the plurality, to produce a plurality of individual frequency spectra, each individual frequency spectrum comprising a plurality of values;
  combining one or more values from several of the individual frequency spectra, to produce one or more combined values; and
  detecting the ensemble signal lock condition based at least in part on the one or more combined values.

This can provide an "ensemble lock" detection method, which is able to determine whether a GNSS receiver has signal lock on an ensemble of visible satellite signals in one or more GNSS constellations. Signal "lock" refers to successful tracking of the signals. The tracking of each signal may comprise one or more of: tracking a carrier frequency of the signal, for example using a frequency locked loop (FLL); tracking a code phase of a spreading code of the signal, for example using a delay locked loop (DLL); and tracking a carrier phase of the signal, for example using a phase locked loop (PLL). In poor reception conditions, tracking (of any or all of these types) may fail for one or more signals. This may lead to an inaccurate position, velocity, and time (PVT) solution. It would be desirable to know when tracking has failed, in order to be able to warn a user or application of the failure and/or take remedial action.

Because the ensemble lock detection integrates information from several frequency spectra, the one or more combined values may provide a more reliable indication of whether the satellite signals are being tracked successfully. This may provide better performance, in at least some circumstances, compared with a system in which signal lock is assessed only separately for each signal (for example, based on each individual frequency spectrum). For example, in difficult reception conditions, with low carrier to noise ratio, it may be possible to detect an ensemble lock even though it is not possible to reliably detect an individual signal lock for each visible satellite. In essence, the consistency between the (correctly) tracked signals acts as an indicator of confidence in the tracking.

In some examples, each individual frequency spectrum may be an amplitude or magnitude spectrum. That is, the values in each spectrum may be amplitude or magnitude values. In some examples, each individual frequency spectrum may be a power spectrum. That is, the values in each spectrum may be power values. Each frequency spectrum may be generated using a frequency transform—for example, a discrete Fourier transform (DFT) or Fast Fourier Transform (FFT).

Combining the one or more values from several of the individual frequency spectra may comprise summing the one or more values. In some examples, the one or more values may comprise the entirety of each individual frequency spectrum. That is, the one or more values may comprise or consist of each and every value (for each and every respective frequency bin) from each of the "several" individual frequency spectra. The combining may therefore comprise summing the individual frequency spectra—summing corresponding values across the different spectra. (Here, "corresponding" values means values that relate to the same frequency.) Alternatively or in addition, in some examples, the one or more values may comprise the maximum value in each individual frequency spectrum (denoted the "maximum individual value"). The combining may therefore comprise summing the maximum individual values.

The "several" individual spectra considered in the combining may be a subset of, or all of, the individual frequency spectra.

Tracking the plurality of signals may comprise tracking the code phase delay and carrier frequency and phase of each signal.

The one or more combined values may comprise a plurality of combined values associated with respective frequencies, wherein detecting the ensemble signal lock condition comprises identifying the maximum value among the plurality of combined values and detecting the ensemble signal lock condition based at least in part on the maximum value.

Combining the values may comprise summing corresponding values across individual frequency spectra. In some examples, combining the values may comprise summing all corresponding values (from corresponding frequency bins) across the individual frequency spectra, to produce a combined frequency spectrum. The maximum value among the plurality of combined values may be denoted the "maximum combined value". The combined values may be magnitude values or power values, for example.

Detecting the ensemble signal lock condition may comprise comparing the maximum combined value with a first threshold. Detecting the ensemble signal lock condition may comprise detecting the ensemble signal lock condition if the maximum combined value exceeds the first threshold.

Combining the one or more values may comprise: identifying the maximum value in each of the several individual frequency spectra; and summing the identified maximum values to calculate a combined maximum value.

Detecting the ensemble signal lock condition may comprise comparing this combined maximum value with a second threshold. The ensemble signal lock condition may be detected if this combined maximum value exceeds the second threshold. The second threshold may be higher than the first threshold.

In particular, the ensemble signal lock condition may be detected if (i) the maximum combined value exceeds the first threshold and (ii) the combined maximum value exceeds the second threshold. The absence (or loss) of ensemble signal lock may be detected if either condition (i) or condition (ii) is not satisfied.

The values in each individual frequency spectrum may be associated with respective frequencies, and the method may further comprise, for each individual frequency spectrum: identifying the maximum value in the individual frequency spectrum; and detecting an individual signal lock condition based on the identified maximum value.

For example, the maximum value of each individual frequency spectrum may be compared with a third threshold. The individual signal lock condition may be detected if the maximum value of the individual frequency spectrum is greater than the third threshold. The third threshold may be higher than the first threshold and/or lower than the second threshold.

When the individual signal lock condition is not detected for a given signal, the method may comprise one or both of: (a) excluding that signal when detecting the ensemble signal lock condition; and (b) excluding that signal when calculating a position fix.

When the individual signal lock condition is not detected for a given signal, the method may comprise controlling a GNSS receiver to re-acquire that signal.

Optionally, the third threshold may be selected based on an estimate of noise power, for example based on an estimated carrier to noise ratio ($C/N_0$). In this way, the threshold may be adapted to the signal conditions. In particular, the third threshold may be selected in direct relation to noise power, such that higher estimates of noise power lead to selection of higher thresholds.

The method may further comprise calculating a position fix based on the plurality of signals, wherein, if the ensemble signal lock condition is detected, the method comprises outputting the position fix.

Alternatively (or in addition), if the ensemble signal lock condition is not detected, the method comprises suppressing the output of a (or the) position fix.

In some examples, if the ensemble signal lock condition is not detected, the method may comprise suppressing calculation of a position fix (rather than calculating it and merely suppressing its output). This may help to reduce computational effort and consequently power consumption.

Alternatively, in some examples, if the ensemble signal lock condition is not detected, the method may comprise outputting the position fix together with a warning flag. The warning flag may warn a software application or a user that the position fix might not be reliable.

The method may comprise calculating a position, velocity, and time (PVT) solution based on the plurality of signals. The position fix may be part of the PVT solution.

The method may further comprise, if the ensemble signal lock condition is not detected, controlling a GNSS receiver to re-acquire satellite signals.

The re-acquiring may comprise searching for the satellite signals over a range of one or both of: a code-phase of a spreading code of each satellite signal; and a carrier frequency of each satellite signal. The carrier frequency search may comprise a search of Doppler frequencies about a nominal carrier frequency of the satellite signal.

The method may further comprise: calculating a PVT solution based on the plurality of signals; and predicting tracking parameters for each of the plurality of signals based on the calculated PVT solution.

The PVT solution may be calculated using a navigation filter, for example a Kalman filter. The tracking parameters for each signal may comprise any one, or any combination of two or more, of: a carrier phase, a carrier frequency, a rate of change of carrier frequency, and a code-phase. Predicting the tracking parameters may comprise converting the PVT solution into the tracking parameters. In this way, the navigation filter is included in one or more tracking loops for each signal. That is, tracking feedback control is provided via a navigation filter. This may provide improved tracking, compared with a solution in which tracking is performed separately for each signal. The navigation filter is able to integrate information from all the channels and may thereby produce more accurate (and/or less noisy) predictions of the tracking parameters. The tracking loops may comprise one or more of: a delay locked loop (DLL), a phase locked loop (PLL), and a frequency locked loop (FLL).

The method may further comprise: demodulating at least one signal of the plurality of signals to detect data bits; and wiping off the detected data bits from the at least one signal, wherein the individual frequency spectrum for the at least one signal is calculated after wiping off the detected data bits.

This approach of demodulating and wiping off the detected data bits may be applied to each of the plurality of signals. Wiping off a detected data bit from a signal may comprise multiplying I/Q samples derived from the signal by the detected data bit.

The individual frequency spectrum for the at least one signal may be calculated from a set of samples of the at least one signal, wherein the set of samples spans multiple detected data bits.

In particular, a coherent integration period used for calculating the individual frequency spectrum may span multiple data bits. The coherent integration period may be an integer multiple of the bit duration. The integer multiple may be at least 2, at least 5, at least 10, or at least 15 times the bit duration. The integer multiple may be less than 50, optionally less than 40, optionally less than 30, or optionally less than 25 times the bit duration. For example, for a GPS L1 C/A signal, the data bits may have bit duration of 20 (milliseconds) ms and the coherent integration period may be 400 ms—that is, 20 times the bit duration.

Calculating the individual frequency spectrum may comprise: calculating a set of frequency spectra, each frequency spectrum of the set being calculated over a respective coherent integration period; and summing the frequency spectra of the set to produce the individual frequency spectrum. This effectively averages the frequency spectra by summing (non-coherently) the results from multiple coherent integration periods. According to one example, good results were achieved by summing over 7 coherent integration periods. This can also be seen as a low-pass filtering of the calculated frequency spectrum, to reduce noise. The number of frequency spectra in the set may be at least 2, or at least 4. The number may be less than or equal to 15, optionally less than or equal to 10.

The samples may be complex samples, comprising in-phase (I) and quadrature (Q) components.

Alternatively or in addition to summing/averaging/low-pass filtering over coherent integration periods when calculating the individual frequency spectra, the method may comprise summing/averaging/low-pass filtering when combining individual frequency spectra. For example, the step of combining one or more values from several of the individual frequency spectra may comprise summing (non-coherently) the one or more values over multiple coherent integration periods, and/or summing one or more of the combined values from multiple coherent integration periods.

In some examples, the method may comprise: demodulating at least one signal of the plurality of signals to detect data bits; and wiping off the detected data bits from the at least one signal, the method further comprising estimating a code phase for the at least one signal after wiping off the detected data bits.

The estimated code phase and calculated frequency spectrum may be provided as inputs to a navigation filter configured to calculate a PVT solution (for example, as summarised already above).

Also provided is a computer program comprising computer program code configured to cause one or more physical computing devices to perform all the steps of the method as claimed in any one of the preceding claims when said computer program is run on said one or more physical computing devices. The one or more physical computing devices may comprise or consist of one or more processors of a GNSS receiver. The computer program may be stored on a computer-readable storage medium (optionally a non-transitory computer-readable storage medium).

In one aspect (not according to the presently claimed invention), there is provided a wireless receiver configured to receive a plurality of signals, the wireless receiver comprising:
  one or more tracking loops, configured to track the plurality of signals;
  a frequency estimator, configured to calculate an individual frequency spectrum for each signal in the plurality, to produce a plurality of individual frequency spectra; and
  an ensemble lock detector, configured to:
    combine one or more values from several of the individual frequency spectra, to produce one or more combined values; and
    detect an ensemble signal lock condition based at least in part on the one or more combined values.

The wireless receiver may be configured to receive radio signals. In particular, the wireless receiver may be a GNSS receiver.

Consequently, according to an aspect of the present invention there is provided a measurement engine for a Global Navigation Satellite System, hereinafter GNSS, receiver, configured to receive signals from a GNSS, wherein the measurement engine is configured to track a plurality of signals received from a respective plurality of satellites in the GNSS, the measurement engine comprising:
  one or more frequency estimators, configured to calculate an individual frequency spectrum for each signal in the plurality, to produce a plurality of individual frequency spectra; and
  an ensemble lock detector, configured to:
    combine one or more values from several of the individual frequency spectra, to produce one or more combined values; and
    detect an ensemble signal lock condition based at least in part on the one or more combined values.

The ensemble lock detector may employ any of the methods summarised previously above for detecting the ensemble signal lock condition.

The measurement engine may further comprise: a bit detection unit, configured to demodulate at least one signal of the plurality of signals to detect data bits; and a multiplier, configured to wipe off the detected data bits from the at least one signal, wherein the frequency estimator is configured to calculate the individual frequency spectrum for the at least one signal after the wipe-off of the detected data bits. For this purpose, an output of the multiplier may be coupled to an input of the frequency estimator.

The measurement engine may further comprise a code phase estimator, configured to estimate a code phase for at least one signal of the plurality of signals.

The code phase estimator may be configured to estimate the code phase after the wipe-off of the detected data bits. For this purpose, an output of the multiplier summarised above may be coupled to an input of the code phase estimator.

The measurement engine may further comprise a channel lock detector for each of the plurality of signals, configured to detect an individual signal lock condition based on the respective individual frequency spectrum of the signal, wherein the measurement engine is configured to exclude the respective signal from being used in the detection of the ensemble signal lock condition if the individual signal lock condition is not detected.

Each channel lock detector may be configured to identify the maximum value in the respective individual frequency spectrum, and detect the individual signal lock condition based on the identified maximum value.

The one or more combined values may comprise a plurality of combined values, optionally forming a combined frequency spectrum. The ensemble lock detector may be configured to identify the maximum combined value in the plurality of combined values (for example, the maximum value in the combined frequency spectrum), and to detect the ensemble signal lock condition based at least in part on the maximum combined value. In particular, the ensemble lock detector may be configured to: compare the maximum combined value with a first threshold; and detect the ensemble signal lock condition if the maximum combined value exceeds the first threshold.

Alternatively or in addition, the ensemble lock detector may be configured to identify the maximum value in each of the several individual frequency spectra; and sum the identified maximum values to calculate a combined maximum value. The ensemble lock detector may be configured to detect the ensemble signal lock condition by comparing this combined maximum value with a second threshold.

Each channel lock detector may be configured to: compare the maximum value in the respective individual frequency spectrum with a third threshold; and detect the individual signal lock condition if said maximum value exceeds the third threshold.

Also provided is a GNSS receiver comprising a measurement engine as summarized above.

The GNSS receiver may further comprise: an RF front-end, for receiving the signals; and an intermediate-frequency (IF) processing unit, for converting the signals from RF to IF. The GNSS receiver may further comprise, for each signal, a mixer for down converting the signal. An output of the RF front-end may be coupled to an input of the intermediate-frequency processing unit. An output of the first IF processing unit may be coupled to an input of each mixer.

The GNSS receiver may further comprise, for each signal, at least a first correlator, coupled to an output of the respective mixer, configured to wipe off a spreading code of the signal. The first correlator may be part of a bank of correlators, including early, prompt, and late correlators.

An output of the first correlator may be coupled to an input of a respective multiplier and a respective bit detection unit (both of which may be as summarised above).

The GNSS receiver may further comprise: a navigation filter, configured to calculate a PVT solution based on the plurality of signals; and a parameter conversion unit, configured to predict tracking parameters for each of the plurality of signals based on the calculated PVT solution.

BRIEF DESCRIPTION OF THE DRAWINGS

The invention will now be described by way of example with reference to the accompanying drawings, in which.

It should be noted that these figures are diagrammatic and not drawn to scale.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms.

Figure 1:
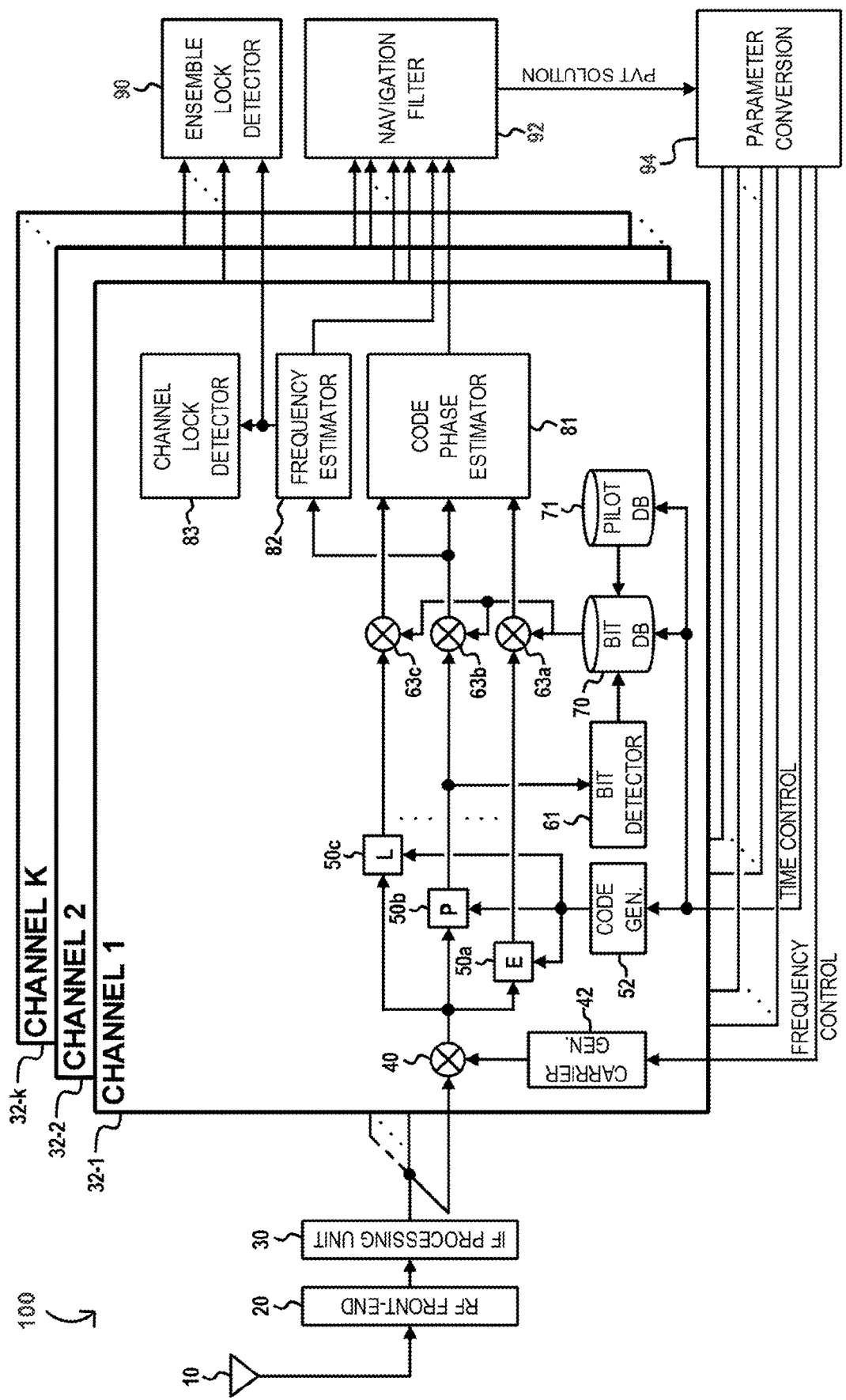
FIG. 1 is a schematic block diagram of a GNSS receiver according to an example.

FIG. 1 is a schematic block diagram of a GNSS receiver 100 according to an example. The GNSS receiver is configured to receive satellite signals from GPS satellites. However, it should be emphasized that this is merely one non-limiting example—the GNSS receiver may alternatively or additionally be configured to receive satellite signals from one or more other constellations (for example, GLONASS, Galileo and BeiDou). The GNSS receiver comprises an antenna 10 for receiving satellite signals. An RF front-end 20, coupled to the antenna 10, is configured to down-convert and digitise the satellite signals received via the antenna 10. The RF front-end essentially conditions the signals for subsequent signal processing. Other typical tasks performed by the front-end include filtering, amplification and automatic gain control. The satellite signals received at the RF front-end 20 via the antenna 10 include at least one ranging signal, such as an L1 C/A signal, for each of a plurality of satellites (SVs).

The GNSS receiver further comprises an intermediate frequency (IF) processing unit 30, configured to process the satellite signals converted from radio frequency (RF) 20) to IF in the RF front-end. The output of the IF processing unit 30 is coupled to the inputs of a plurality of tracking channels 32-1, 32-2, . . . 32-$k$. Each of these K tracking channels is responsible for processing a particular satellite signal—that is, tracking, demodulating, and analysing a ranging signal acquired from a respective different satellite. In the following, the first tracking channel 32-1 will be described. However, it should be understood that all of the tracking channels are substantially identical—each one comprises the same components, which perform the same functions. The only difference between them is that they process different satellite signals and therefore, may operate with different information or data.

In each tracking channel 32-1, 32-1, . . . 32-K, the output of the IF processing unit 30 is coupled to an input of a mixer 40. The other input of the mixer 40 receives a local carrier wave, hereafter replica carrier signal, generated to replicate the instantaneous carrier frequency and carrier phase of the incoming satellite signal to be processed by this tracking channel. The locally generated replica carrier signal is a digital sinusoidal signal generated by a carrier generator 42. In this way, the mixer 40 is configured to wipe off, i.e. remove any residual carrier, e.g. offset caused by the Doppler effect, from the incoming signal, by mixing the incoming signal with the locally generated replica carrier signal (in other words, calculating the product of the incoming signal and the local replica carrier signal). Although the carrier of the satellite signal is already removed before the incoming signal reaches mixer 40, there will be a carrier offset, or residual carrier caused by the relative motion between the satellite and GNSS receiver. The carrier generator 42 comprises a numerically controlled oscillator (NCO) configured to generate the local replica carrier signal.

The output of the mixer 40 is provided as input to a bank of correlators comprising, in the present example, three correlators 50a-c. Each correlator comprises a multiplier and an integrate-and-dump (I/D) unit (not shown explicitly in the diagram). The multiplier multiplies the input signal by a locally generated replica spreading code of the satellite signal. The I/D unit integrates of calculates the sum of the resulting product values, over a suitable dwell period. The dwell defines the length of the coherent integration. The bank of correlators includes an "early" (E) correlator 50a; a "prompt" (P) correlator 50b; and a "late" (L) correlator 50c. As their names suggest, these three correlators use differently shifted versions of the replica spreading code. The local replica spreading code is a binary pseudo-random noise (PRN) code signal, and is generated by a code generator 52, which operates under the control of a time control signal.

The code generator 52 is a PRN code generator for the selected PRN code which corresponds to a particular satellite signal. It comprises an NCO, which is configured to generate a clock signal for generating the local replica spreading code for the satellite signal being tracked, e.g. the L1 C/A signal. The NCO is controlled by the time control signal.

The outputs of the correlators 50a-c consist of complex-valued samples, also referred to as in-phase and quadrature-phase samples (I/Q samples). In particular, the output of the prompt (P) correlator 50b, represents I/Q samples derived from the satellite signal. It should be understood that, although each correlator 50a-c in the bank of correlators is shown as a single unit, when implemented in hardware, the correlator (as with other hardware blocks) will include separate I- and Q-branches, each branch comprising a separate correlator. That is, there will be a multiplier and an I/D unit for the in-phase (I) samples, and another multiplier and I/D unit for the quadrature-phase (Q) samples. Nevertheless, for simplicity, it is more convenient to illustrate these in the form of a single correlator, having complex outputs, and that is how it will be described here.

The I/Q samples from the "P" correlator 50b are provided as input to a bit detection unit 61, which is configured to demodulate the satellite signal. That is, the bit detection unit 61 performs bit detection on the I/Q samples, to obtain data bits of the navigation message that has been modulated onto the signal by the satellite before transmission. For example, the data bits may be data bits of the L1 C/A navigation message.

It is desirable to demodulate the data bits of the navigation message in order to decode the navigation message. However, according to the present example, the detected bits are also employed for another purpose. They will be used to wipe off the data bits from the IQ samples derived from the satellite signal prior to code phase estimation and frequency estimation. This may help to improve the accuracy of both of these processes.

As shown in FIG. 1, the bits detected by the bit detection unit 61 are output to a bit database 70. The bit database 70 also receives input from a pilot bit database 71. The pilot bit database 71 stores the known sequence of pilot bits for the satellite signal. Because they are known pilot bits, there is no need to rely on bit detection to determine these bits. Indeed, relying on bit detection for these pilot bits may be less accurate, because bit detection may fail. In this way, by using the pilot bits from the pilot bits database 71, the results of bit wipe-off may be improved. In the bit database 70, the known pilot bits from the pilot bit database 71 are combined with the (previously unknown) detected bits provided by the bit detection unit 61. The bit detection database 70 outputs, for each bit period, the relevant data bit (a pilot bit or a detected bit, as appropriate, depending on the signal—for example, depending on which part of which sub-frame is currently being processed). When the signal carrier to noise ratio ($C/N_0$) is high, the bit detection unit 61 detects bits and populates the bit database 70. The sub-frame structure of a GNSS navigation message is typically cyclical. This is because the navigation message contains ephemeris data which is typically valid for 2 hours. The same ephemeris data is repeated (for example, on a 30-second cycle) for a 2-hour period. Consequently, once the bit database has been populated with detected bits, the data bits of subsequent sub-frames can be predicted accurately, within the period of validity of the ephemeris. When the signal carrier to noise ratio is low, there is no need for bit detection. The bit database 70 outputs the appropriate bits-either pilot bits, or previously detected data bits.

The data bits output by the bit database 70 provide a first input to each multiplier 63a-c in a bank of multipliers. Each bit is represented as either +1 or −1. Each multiplier 63a-c also receives a second input consisting of a set of I/Q samples. The I/Q samples are provided by the outputs of the respective correlators 50a-c. That is, a first multiplier 63a receives I/Q samples from the early correlator 50a; a second multiplier 63b receives I/Q samples from the prompt correlator 50b; and a third multiplier 63c receives I/Q samples from the late correlator 50c.

Each multiplier 63a-c multiplies its two inputs, in order to wipe off the bits from the I/Q samples. Following the bit wipe-off, the I/Q samples are provided to a code phase estimator 81. The code phase estimator 81 is configured to estimate the code phase of the spreading code of the satellite signal. Depending on which of the three correlators (E, P, L) and respective multipliers 63a-c has produced the maximum (largest magnitude) output value for the current dwell, the code phase estimator 81 determines whether to adjust (for example, increment or decrement) the estimated code phase. Code phase estimates for each tracking channel (that is, each code-phase tracking loop) are provided to a navigation filter 92.

The output of the second multiplier 63b, corresponding to the prompt correlator 50b, is also provided as input to a frequency estimator 82. The frequency estimator calculates an individual frequency spectrum for the satellite signal being processed by the tracking channel. According to the present example, the frequency estimator implements a discrete Fourier transform (DFT) to calculate the individual frequency spectrum. The individual frequency spectrum comprises a plurality of values, corresponding to a respective plurality of frequencies. Because the bits have been wiped off prior to calculation of the frequency spectrum, the DFT is able to operate with a longer coherent integration period than would otherwise usually be the case. In the present example, the DFT integrates over a coherent integration period of 400 milliseconds (ms). This corresponds to 20 bit-periods of the L1 C/A navigation message. This longer coherent integration period helps to increase the accuracy of the frequency estimation.

In order to further enhance the accuracy of the frequency estimation, the results from multiple coherent integration periods are summed. In the present example, the frequency estimator 82 calculates the sum of 7 successively calculated frequency spectra—that is, 7 separate frequency spectra, calculated over 7 respective coherent integration periods. Optionally, the sum of the frequency spectra may be divided by the number of frequency spectra, to produce a mean frequency spectrum. The non-coherent summation (that is, integration) over frequency spectra from successive coherent integration periods has the effect of averaging or low-pass filtering the frequency estimate for a particular tracking channel. This can help to remove noise, improving the accuracy of the frequency estimation.

The individual frequency spectrum produced and output by the frequency estimator 82 is provided as input to a channel lock detector 83 and an ensemble lock detector 90. The frequency estimator 82 also provides a second output, comprising an indication of the frequency at which the individual frequency spectrum has its maximum magnitude. This is provided as an additional input to the navigation filter 92.

The channel lock detector 83 is configured to analyse the individual frequency spectrum to detect whether the respective channel which comprises the channel lock detector 83 is in lock with the satellite signal it is attempting to track. Hereafter, this is referred to as an individual signal lock condition. In particular, in the present example, the channel detector 83 is configured to identify the maximum magnitude value in the individual frequency spectrum. If this maximum magnitude is above a threshold, then the channel lock detector 83 declares the individual signal lock condition to be met. If the maximum magnitude value is below the threshold, then the channel lock detector 83 declares that the individual signal lock condition is not met. The channel lock detector 83 outputs an indication of the individual signal lock condition. The threshold used for detecting the individual signal lock condition will be referred to as the "third threshold", for consistency with the appended claims.

If the individual signal lock condition is not detected (that is, if the signal lock has been lost) then the measurements made by the respective tracking channel will be excluded from use in any further processing. In particular, the individual frequency spectrum will not be provided by the frequency estimator 82 to the ensemble lock detector 90, nor will the frequency be provided by the frequency estimator 82 to the navigation filter 92. Similarly, the code phase estimate produced by the code phase estimator 81 will not be provided to the navigation filter 22.

In practice, in the present implementation, when the loss of signal lock is detected by the channel lock detector 83, the entire tracking channel concerned is switched to an idle mode. In the idle mode, none of the functions of the tracking channel are performed. Therefore, none of the blocks in the tracking channel produces the output. This helps to reduce power consumption on the GNSS receiver.

It will be noted that the individual tracking channels 32-1, 32-2, ... 32-K do not include their own tracking loops for either the residual carrier frequency and carrier phase or the code phase. According to the present example, the tracking loops are instead completed via the navigation filter 92.

The navigation filter 92 implements the typical functions of a navigation filter in a GNSS receiver. It receives as inputs the code phase estimate (produced by the code phase estimator 81) and the frequency (produced by the frequency estimator 82) from each of the tracking channels 32-1, 32-2, ... 32-K. Together, the frequency and the code phase estimate comprise a set of GNSS measurements. The navigation filter takes these GNSS measurements and uses them to calculate a position, velocity, and time (PVT) solution for each epoch. Epochs are separated by update intervals, determined by the update rate of the navigation filter.

In the present example, the navigation filter 92 comprises a Kalman filter (KF). However, the navigation filter 92 in another example may comprise a least-squares filter. In either case, the navigation filter 92 is a recursive state estimator. At each of a plurality of epochs, the Kalman filter estimates the current value of a state vector of state variables, along with their associated uncertainties. The estimate for the current state vector is based on the estimated state from the previous epoch and the current GNSS measurements. The state variables estimated by the Kalman filter include the PVT solution and optionally other variables. The use of Kalman filtering (also known as linear quadratic estimation) in GNSS positioning is well known in the art and will not be described in further detail here.

The PVT solution produced by the Kalman filter for each epoch is output to a parameter conversion unit 94. This converts the PVT solution into tracking parameters for each individual signal being tracked. The tracking parameters are fed back to the individual tracking channels for the respective satellite signals. More specifically, the parameter conversion unit 94 uses the PVT solution to predict tracking parameters for each of the plurality of signals. The tracking parameters include: a time control signal, for controlling the code generator 52; and a frequency control signal, for controlling the carrier generator 42.

The frequency control signal ensures that the frequency (and phase) of the local replica carrier signal (generated by the carrier generator 42) tracks the actual frequency (and phase) of the residual carrier of the received satellite signal, e.g. L1 signal, as closely as possible. This enables the GNSS receiver to take account of Doppler shift, due to the relative motion between the receiver and satellite. By controlling the frequency of the NCO in the carrier generator 42, both the frequency and phase of the replica carrier signal are controlled to match the frequency and phase of the residual carrier. (The phase of the replica carrier signal is advanced by increasing the frequency; the phase is retarded by decreasing the frequency.) Effectively, this implements a phase locked loop (PLL), tracking the frequency and phase of the residual carrier. However, unlike a conventional PLL in a GNSS receiver, the carrier tracking loop is completed via the navigation filter 92. The frequency control signal for each channel is therefore calculated taking into account all of the information provided by all of the channels. This can help to ensure that the carrier tracking is more accurate and/or robust.

The time control signal ensures that the code phase of the replica spreading code used by the "P" correlator tracks the actual code phase of the received satellite signal with as little delay as possible. In this way, the bank of correlators 50*a-c* and the code generator 52, function as part of a code phase tracking loop—in other words, a delay locked loop (DLL)—for the satellite signal. However, unlike a conventional DLL in a GNSS receiver, the tracking loop is completed via the navigation filter 92. The time control signal for each channel is therefore calculated taking into account all of the information provided by all of the channels. This can help to ensure that the code phase tracking is more accurate and/or robust.

The code phase tracking loops and the carrier tracking loops may be viewed as a plurality of individual tracking loops, which are completed via the navigation filter 92. Alternatively, they may be considered as a single global tracking loop that tracks a vector of tracking parameters for all of the channels together.

The ensemble lock detector 90 receives as input the individual frequency spectra output by the tracking channels 32-1, 32-2, ... 32-K for the respective satellite signals. The purpose of the ensemble lock detector is to take a global view of whether or not signal lock is being maintained correctly over the ensemble of satellite signals. In order to do this, it combines information from the individual frequency spectra and analyses this information in order to detect the signal lock condition. This process will be described in more detail below, with reference to FIGS. 3-4.

Figure 2:
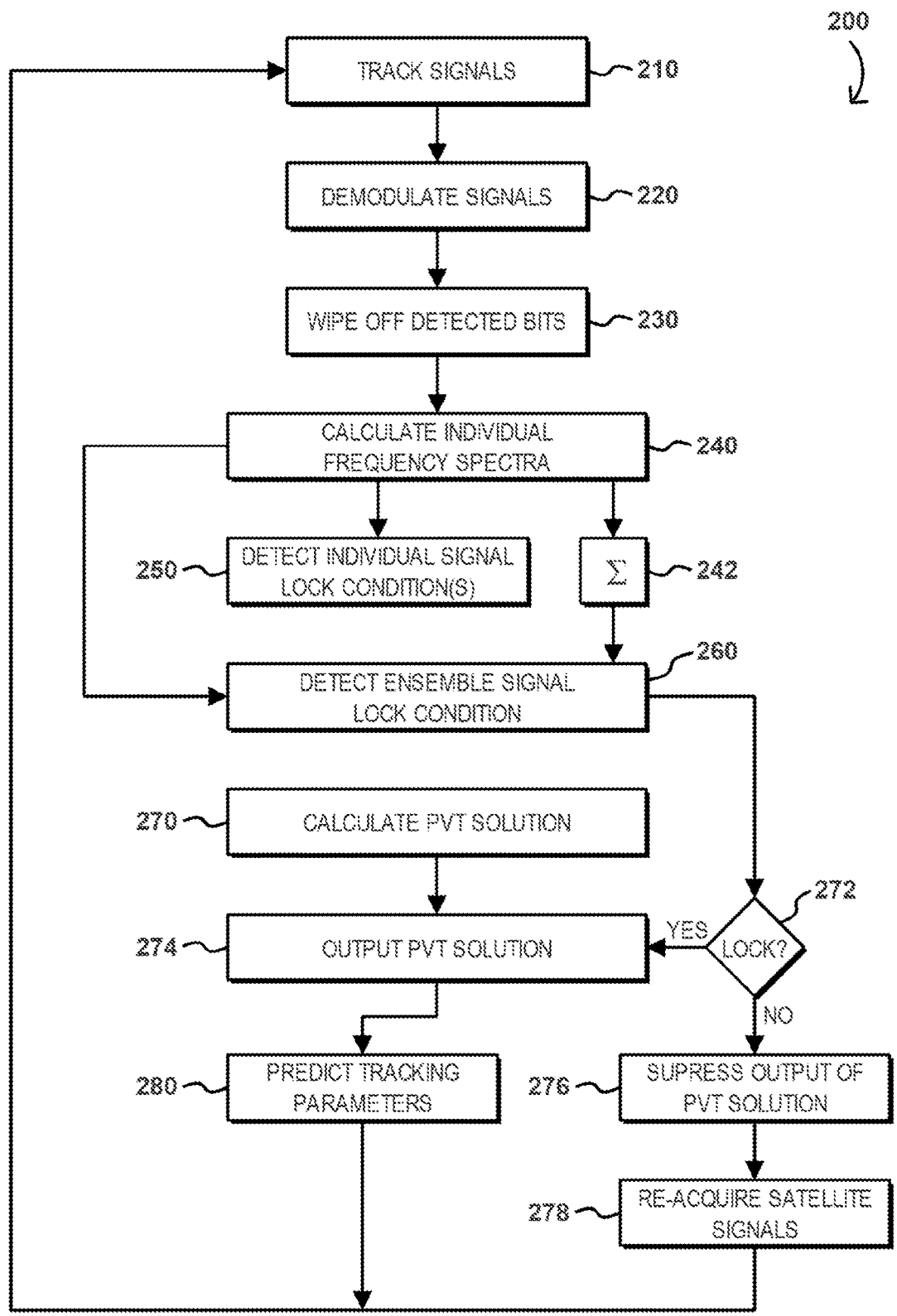
FIG. 2 is a flowchart illustrating a method performed by the GNSS receiver of FIG. 1 according to an example.

FIG. 2 is a flowchart illustrating a method 200 performed by the GNSS receiver 100 of FIG. 1 according to an example.

In step 210, one or more tracking loops of the GNSS receiver track the plurality of satellite signals in the manner described above. The one or more tracking loops include the carrier generator 42, the mixer 40, the correlators 50*a-c*, the code generator 52, the multipliers 63*a-c*, the code phase estimator 81, and the frequency estimator 82, for each channel, as well as the navigation filter 92, and the parameter conversion unit 94.

In step 220, the bit detection unit 61 for each channel demodulates data bits of the navigation message encoded onto the respective satellite signal.

In step 230, the multiplier 63*b* multiplies the I/Q samples derived from the satellite signal by the detected data bits, in order to wipe off the detected data bits from the satellite signal.

In step 240, the frequency estimator 82 calculates the individual frequency spectrum, based on the I/Q samples following bit wipe-off.

In step 250, the channel lock detector 83 detects an individual signal lock condition based on the individual frequency spectrum that was calculated in step 240.

In step 242, the ensemble lock detector 90 combines the individual frequency spectra from the various channels, by summing the magnitude values of all of the different spectra at each respective frequency. This produces a combined frequency spectrum. In other words, by summing the corresponding magnitude values across the different channels, the ensemble lock detector 90 calculates a single combined frequency spectrum having the same number of magnitude values as each individual frequency spectrum. This can be seen as an averaging operation over the different channels. Optionally, the combined frequency spectrum may be normalised by dividing by the number of individual frequency spectra. In this case, each value (at a respective frequency or frequency bin) in the combined frequency spectrum is the mean of the corresponding values (at the same respective frequency, i.e. the same frequency bin) in the individual frequency spectra.

In step 260, the ensemble lock detector 90 detects an ensemble signal lock condition. This is based in part on the maximum magnitude value in each of the individual frequency spectra, and in part on the combined frequency spectrum generated in step 242.

In step 270, the navigation filter 92 calculates the PVT solution. At step 272, the GNSS receiver determines whether the ensemble signal lock condition was detected or not in step 260. If the ensemble signal lock condition was detected, the method proceeds to step 274, in which the PVT solution is output by the navigation filter 92. If the ensemble signal lock condition was not detected, the method proceeds to step 276, in which the PVT solution is suppressed (that is, it is not output by the navigation filter 92). In this case, the method then proceeds to step 278, in which the GNSS receiver changes from a tracking mode of operation to a signal-acquisition mode of operation. In the signal-acquisition mode, the GNSS receiver searches for satellite signals in order to re-acquire them. The searching comprises searching across residual carrier (Doppler) frequencies and across code phases. Once signals are re-acquired, the GNSS receiver returns to the tracking mode. In the present implementation, signal-acquisition is performed by other hardware components, separate from the tracking channels 32-1, 32-2, ... 32-K and not shown in FIG. 1.

If the PVT solution was output in step 274, then the parameter conversion unit 94 converts the PVT solution to tracking parameters, thereby predicting 280 the tracking parameters to be used by the carrier generators 42 and code generators 52 in the tracking loops for the next epoch.

Figure 3:
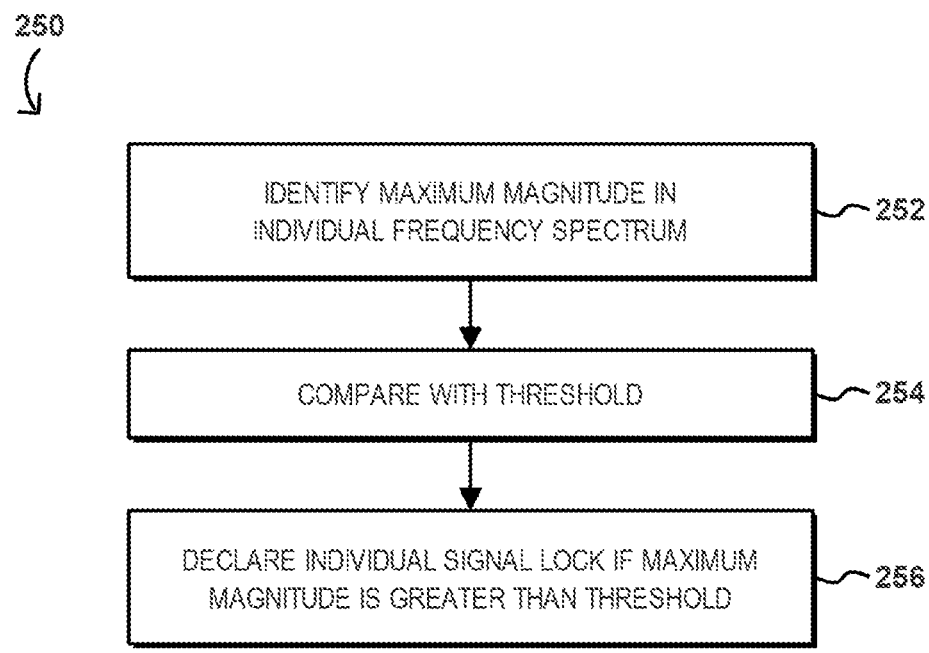
FIG. 3 illustrates a method performed by a channel lock detector, according to an example.
Figure 4:
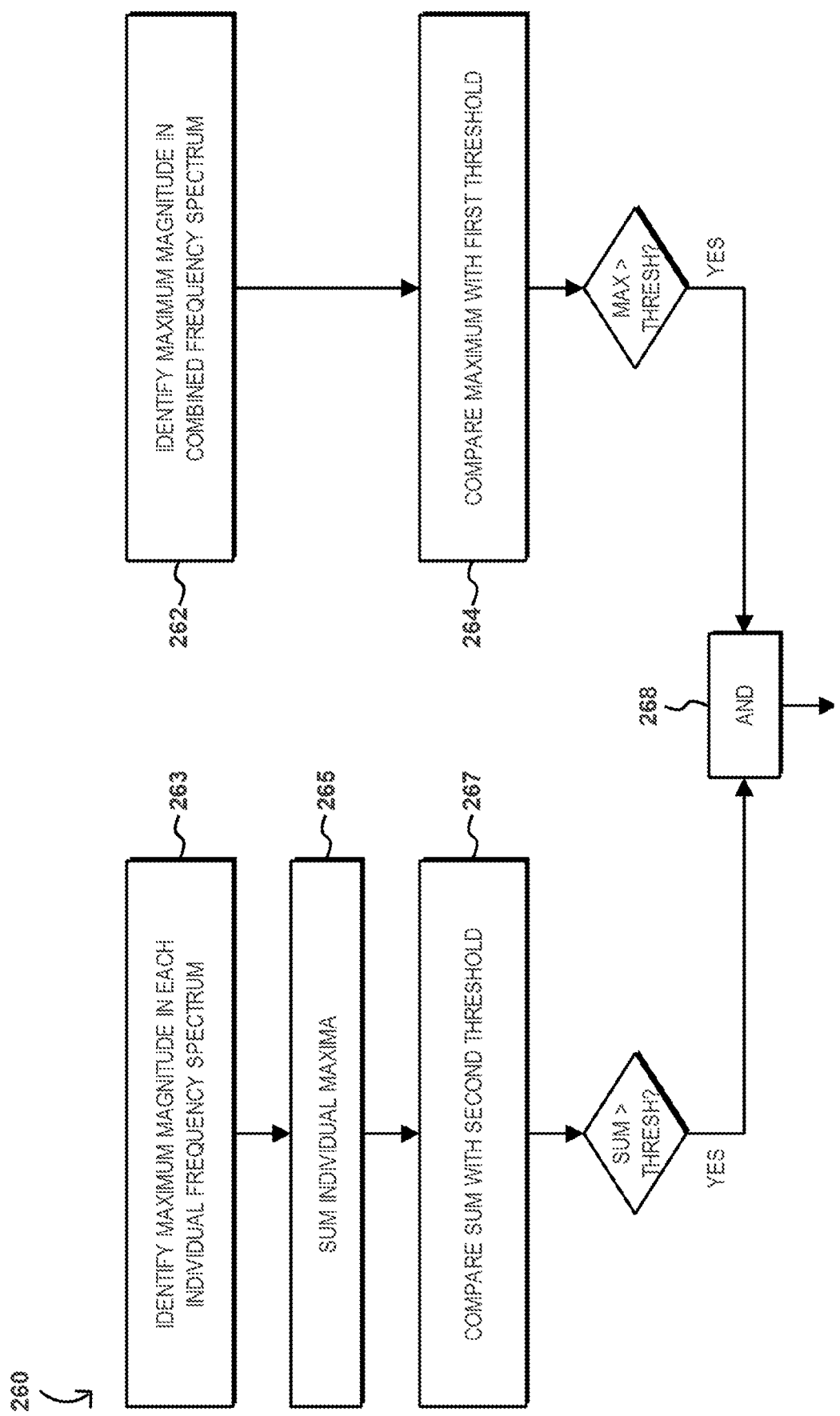
FIG. 4 illustrates a method performed by an ensemble lock detector, according to an example.

FIG. 3 is a flowchart illustrating step 250 in greater detail. In order to detect the individual signal lock condition, the channel lock detector 83 first identifies (in step 252) the maximum magnitude value in the individual frequency spectrum calculated in step 240. Next, in step 254, the channel lock detector 83 compares the maximum magnitude value with a threshold (the "third" threshold). If the value of the maximum magnitude of the individual frequency spectrum is greater than this threshold, the channel lock detector 83 declares that the individual signal lock condition has been detected (step 256). On the other hand, if the maximum magnitude of the individual frequency spectrum is not greater than the threshold, the channel lock detector 83 declares that the individual signal lock condition has not been detected. As explained above, when the individual signal lock condition is not detected, the respective tracking channel switches to the idle mode. 5 FIG. 4 is a flowchart illustrating step 260 in greater detail. In order to detect the ensemble signal lock condition, the ensemble lock detector 90 identifies (in step 262) the maximum magnitude value in the combined frequency spectrum that was calculated in step 242. Next, in step 264, the ensemble lock detector 90 compares the maximum magnitude value of the combined frequency spectrum with a threshold (referred to as the "first" threshold, for consistency with the appended claims).

In a second branch of the flowchart in FIG. 4, the ensemble lock detector 90 analyses other frequency information. In step 263, the ensemble lock detector identifies the maximum magnitude in each of the individual frequency spectra received from the respective frequency estimators 82 of the various tracking channels. In step 265, the ensemble lock detector 90 adds together (that is, sums) these individual maximum values. In step 267, the ensemble lock detector 90 compares the resulting summed value with a second threshold.

The ensemble lock detector 90 tests two conditions to determine whether the ensemble signal lock is detected. If the maximum combined magnitude value (from step 262) is greater than the first threshold, and the sum of the individual maximum magnitude values (from step 265) is greater than the second threshold, then the ensemble signal lock is declared to have been detected. Otherwise, if either of these conditions is not met, the ensemble signal lock is declared not to have been detected. The combination of the two conditions is indicated in FIG. 4 by the logical AND operation 268.

The first, second, and third thresholds may be selected at appropriate levels according to the characteristics of the GNSS receiver and optionally the signal environment.

The first threshold relates to the maximum magnitude in the combined magnitude spectrum. In the present implementation, the combined magnitude spectrum is an average (in particular, mean) frequency spectrum. Good results have been achieved by setting the first threshold to be the lowest of the three thresholds. In other implementations, if the combined magnitude spectrum is generated by summing the individual frequency spectra without dividing by the number of signals, then it may be necessary to scale the first threshold according to the number of signals (since the tracking channels 32-1, 32-2, . . . 32-K may be tracking different numbers of signals at different times).

The second threshold relates to the sum of maximum values from the individual frequency spectra. This sum of maxima is typically a larger value than the maximum magnitude in the combined magnitude spectrum; therefore, the second threshold is typically set higher than the first threshold. Again, this has been found by the present inventor to produce good results.

The third threshold relates to the maximum magnitude each individual frequency spectrum. Good results have been obtained by setting the third threshold to a level between the first and second thresholds. In particular, it has been found to be beneficial to bias the third threshold so that it produces very few false negatives, even at the expense of producing a large number of false positives. That is, the third threshold is biased so that it very rarely dismisses a valid signal lock. It may be selected such that it correctly detects the loss of signal lock (that is, the tracking of noise) in approximately half of all cases, even though this means that it will incorrectly classify noise as a valid signal lock in the other half of the (noise) cases. The reason for biasing the third threshold in this way is that it only needs to provide a weak initial filtering-only the very "worst" individual signals are discounted by the individual channel lock detectors 83, in order to avoid passing information to the ensemble lock detector 90 that is based on nothing but noise. The individual frequency spectra for the remaining signals can be analysed by the ensemble lock detector 90, which is better placed to take an overall view of whether the tracking channels are correctly locked on a valid set of satellite signals.

In some examples, the thresholds may be fixed thresholds. However, in some examples, one or more of the thresholds may be chosen dynamically. For instance, one or more thresholds may be selected based on an estimate of the current carrier to noise ratio ($C/N_0$). The higher the noise power, the higher the threshold that may be appropriate. A suitable set of thresholds for different noise power levels may be stored in a lookup table of the GNSS receiver.

Figure 5:
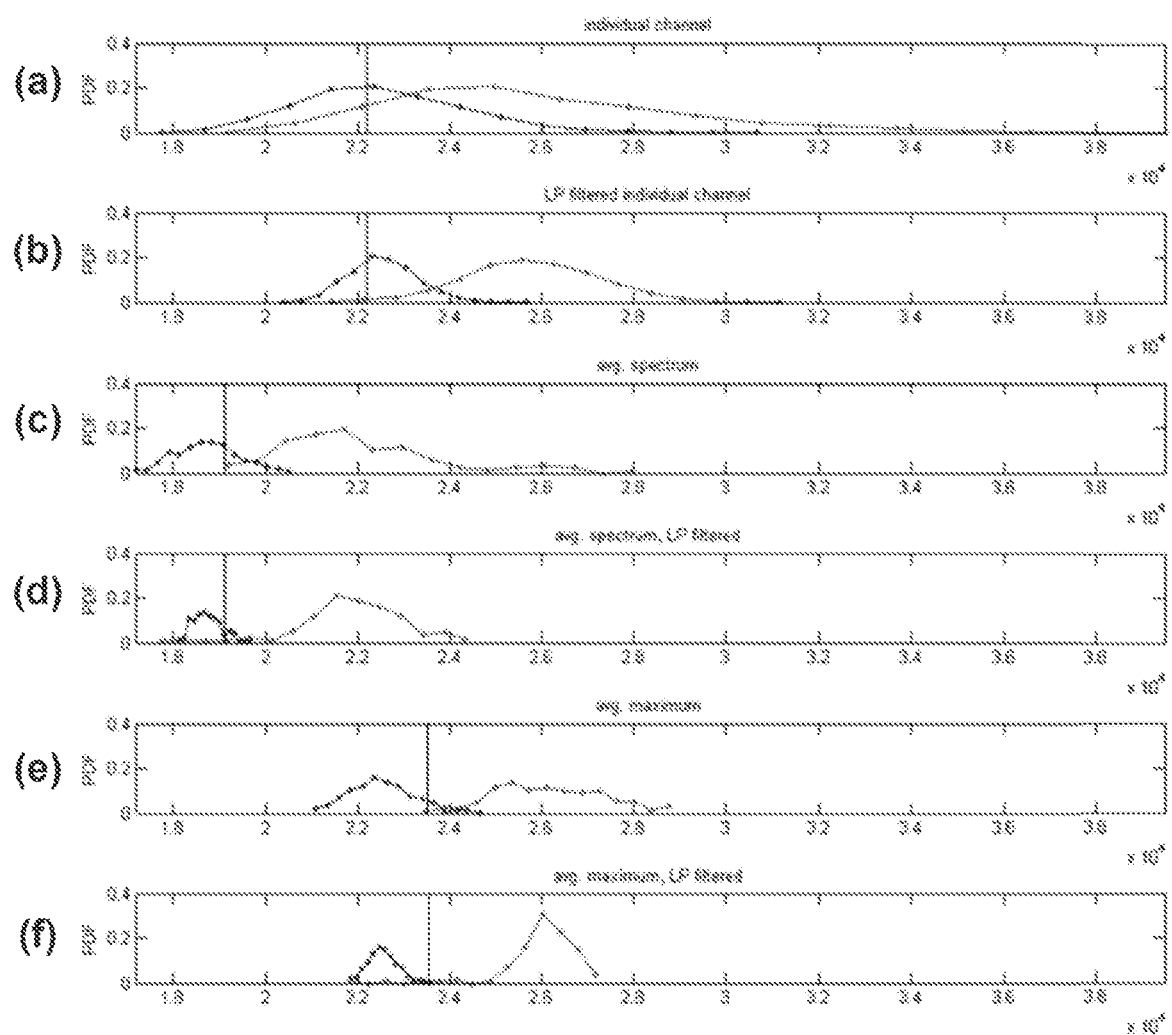
FIG. 5 shows the results achieved using different methods of detecting a signal lock condition.

FIG. 5 illustrates results obtained using different methods of detecting a signal lock condition. Each plot in FIG. 5 shows a conditional probability density function (PDF) corresponding to (i) the noise hypothesis (in black—the curve on the left in each plot) and (ii) the valid signal lock hypothesis (in grey—the curve on the right in each plot). The x-axis shows the magnitude of values in the frequency spectrum. The y-axis shows probability. Therefore, the plots illustrate how the magnitude value is distributed, in the case of a valid signal lock and in the case of noise (no signal lock). The vertical black line on each graph indicates the decision threshold selected in each case, in one example according to the present disclosure.

In FIG. 5(*a*), the magnitude values are maximum magnitude values from individual channels. In other words, each PDF is a histogram of the maximum magnitude values across many individual frequency spectra. The individual frequency spectra are calculated over a coherent integration period of 400 ms, but there is no non-coherent integration (summation). It can be seen that the noise PDF overlaps to a large extent with the PDF for the valid signal lock hypothesis. Consequently, it is difficult to distinguish the noise hypothesis from the valid signal lock hypothesis. A decision made based on applying a threshold to the "raw" frequency magnitude values will make many mistakes—a significant proportion of noise cases will be misclassified as having a valid signal lock; and a significant proportion of valid signal lock cases will be misclassified as noise.

In FIG. 5(*b*), the frequency spectra are low-pass filtered, by non-coherently integrating (that is, summing) 7 successive frequency spectra to form each individual frequency spectrum, before identifying the maximum magnitude (step 252). The values whose distributions are plotted are still based on the individual frequency spectra in isolation—the summation is only done over frequency spectra for the same channel. It can be seen that the separation between the PDFs improves as a result of the low-pass filtering. However, the PDFs still overlap to some extent. Therefore, regardless of where 20) the threshold is set, there will still be a non-negligible number of misclassifications. FIG. 5(*b*) illustrates the test performed in step 250 of the exemplary method, described above. The threshold indicated by the vertical black line in this graph is the third threshold, discussed above.

In FIG. 5(*c*), the magnitude values are obtained by taking the average (mean) of values at corresponding frequencies across the different individual spectra for the various channels, to produce a combined frequency spectrum, before then identifying the maximum value in the combined frequency spectrum. No low-pass filtering is applied. That is, the individual spectra are derived directly from DFTs in 400 ms coherent integration periods. The separation of the PDFs is further improved, compared with both FIG. 5(*a*) and FIG. 5(*b*).

If FIG. 5(*d*), both averaging across channels and low-pass filtering within each channel are applied, when generating the combined frequency spectrum, before identifying the maximum value in the combined frequency spectrum. In other words, the individual frequency spectra are based on the sum of 7 DFTs over 7 successive 400 ms coherent integration periods, and the individual frequency spectra are combined by summing them across channels. The value whose distribution is plotted is the maximum of the resulting combined frequency spectrum. As seen in the graph, this leads to an increase in accuracy (reduction in misclassifications), compared with FIG. 5(*b*) and FIG. 5(*c*). FIG. 5(*d*)

corresponds to the test performed in steps 262 and 264. The black vertical line in this graph is the first threshold, discussed above.

In FIG. 5(*e*), the magnitude values are based on finding the maximum magnitude in each individual frequency spectrum, summing the maximum magnitudes found, and dividing by the number of individual frequency spectra. This produces a combined maximum value that is the average (mean) of the maximum magnitudes in the individual frequency spectra. No low-pass filtering is applied—that is, there is no summing non-coherently over coherent DFT integration periods. It can be seen that the overlap between the distributions is minimal.

Finally, in FIG. 5(*f*), the magnitude values are again based on the combined (mean) maximum value derived from the maximum values of the individual frequency however, filtering (non-coherent spectra as in FIG. 5(*e*)); low-pass integration/summation) is used to generate the individual frequency spectra, prior to finding the individual maximum values. Here, it can be seen that the peaks in the distributions are widely separated. This means that not only can a low error rate be expected, but the classification of valid signal lock versus noise is less sensitive to the selection of the threshold used to discriminate between the two classes. FIG. 5(*f*) corresponds to the test performed in steps 263, 265, and 267—although the division (normalisation) by the number of individual frequency spectra not shown explicitly in the drawing. The black vertical line in this graph is the second threshold, discussed above.

It should be understood that the scope of the present disclosure is not limited to the examples described above. Many variations will be apparent to those skilled in the art, based on the foregoing description.

For instance, it should be understood that a transform other than the DFT could be used to generate the individual frequency spectra.

The pilot bit database 71 is not essential. In some examples, the bit database 70 could be constructed solely from bits detected by the bit detection unit 61. In this case, the bit detection unit 61 would be responsible for detecting all data bits of the navigation message—including any pilot bits. This may help to simplify the design of the GNSS receiver. However, if the bit detection unit makes bit detection errors when demodulating the pilot bits, these may degrade the bit wipe-off to some extent.

The example of FIG. 1 uses a vector tracking loop—that is, an arrangement in which all of the tracking loops are completed via the navigation filter 92. Although believed to be advantageous, this is not essential. For instance, the GNSS receiver could instead implement a separate PLL and DLL for each channel individually, as is conventional.

In the example of FIG. 2, the PVT solution is calculated irrespective of whether the ensemble signal lock condition is detected. Output of the PVT solution is then suppressed if the ensemble signal lock condition is not detected. However, in other examples, calculation of the PVT solution may be suppressed if the ensemble signal lock condition is not detected. For instance, the GNSS receiver may be configured such that, if the ensemble signal lock condition is not detected, all tracking channels enter the idle mode. This then prevents the navigation filter from calculating a PVT solution for the current epoch. The frequencies and code phase estimates may be provided to the navigation filter again after the GNSS receiver has re-acquired the satellite signals (that is, once the signal lock condition is detected again).

In the example discussed above, all individual frequency spectra for which the individual signal lock condition was detected were used in the detection of the ensemble signal lock. This is often desirable, as it makes maximal use of the available information. However, it is not essential. For example, the ensemble lock detector could select a subset of the available individual frequency spectra to evaluate the ensemble signal lock condition. Several individual frequency spectra could be selected based on a criterion such as carrier to noise ratio ($C/N_0$), with a preference for signals exhibiting higher ratios. Alternatively, they could be selected randomly—for example, to implement a random sample consensus (RANSAC) approach.

In the example described above, the ensemble signal lock condition was detected based on two criteria (corresponding to the two branches of the flowchart in FIG. 4). In other examples, it is possible that only one of these criteria may be used. Furthermore, it should be apparent to those skilled in the art that other criteria could be designed, using other ways to select and combine values from the individual frequency spectra to produce one or more combined values. For example, instead of deriving the mean of the maximum magnitudes from each individual frequency spectrum, as discussed above, an average value could be derived using the median of the maximum magnitudes.

Likewise, it is not essential that either the ensemble signal lock condition or the individual signal lock condition is based on one or more maximum values in the respective frequency spectra. Other descriptive statistics could be used (as an alternative, or in addition, to maximum values). In some cases, these may be based on a single value from a frequency spectrum—for example, an order statistic such as the second largest, third largest, or fourth largest (etc.) value, or the value defining a certain percentile, such as the $75^{th}$, $80^{th}$, $85^{th}$ $90^{th}$, or $95^{th}$ percentile. In other cases, they may be based on a combination of multiple values from a frequency spectrum. For example, a descriptive statistic could be constructed by summing or taking an average of the N-largest values, or summing or taking an average of all values above a particular percentile.

In some cases, the use of values other than the maximum can increase the robustness of the method, because it reduces the sensitivity of the signal lock detection to outlier noise.

Another useful statistic is the range from the maximum to the minimum value in any given spectrum. This can capture the amount by which the maximum value exceeds the noise floor. Again, the maximum (and minimum) can be replaced here by other statistics. For example, the range between the $5^{th}$ and $95^{th}$ percentile may be examined in place of the range from the minimum to maximum. Again, by avoiding the direct use of the extreme values (max and min), this approach may be more robust to outliers.

In some circumstances—for example, if the channel is frequency dispersive—the signal energy may be distributed in more than one spectral peak. One way to accommodate this in the signal lock detection is to explicitly consider multiple peaks in the spectrum. For instance, the method may comprise, for a frequency spectrum that is either an individual frequency spectrum or a combined frequency spectrum, identifying two or more local maxima in the frequency spectrum and summing the values of the identified local maxima. Detecting the associated (individual or ensemble) signal lock condition may comprise: comparing the sum of the local maximum values with a predetermined threshold; and detecting the signal lock if the sum exceeds the predetermined threshold. In this way, the signal lock condition can be based on a combination (in this example, a summation) of values for significant frequencies that are spaced apart in the frequency spectrum.

In general, it is beneficial for each signal lock condition to characterise the concentration of energy in the frequency domain (for either individual spectra or combined spectra). When a valid signal lock is achieved, the energy in the spectrum will typically be concentrated around the signal. However, when there is no valid signal lock, and only noise is being received, the (noise) energy will typically be distributed throughout the spectrum. Therefore, statistics characterising the concentration of energy will produce lower values in the case of noise.

The antenna 10 and RF front-end 20 will invariably be implemented in hardware. It should be understood that the other components illustrated in FIG. 1 may be implemented in hardware, or software, or a mixture of both. Furthermore, some components may be grouped together in a given implementation or may be implemented separately. In the present implementation, blocks 20, 30, 40, 42, 50*a-c*, and 52 are implemented in hardware, and the remaining components (downstream in the signal processing chain) are implemented in software. Blocks 61, 63*a-c*, 70, 71, 81, 82, and 83, for each channel, as well as the ensemble lock detector 90, are implemented together in software as a measurement engine, which runs on one processor. The navigation filter 92 and parameter conversion unit 94 are implemented in a separate software module, from the measurement engine. This separate software module may run on the same processor as the measurement engine or on a separate processor. Moreover, it should be noted that the foregoing are merely exemplary implementations. Other implementations are possible, which divide and distribute the various functions differently between hardware and software, or between different hardware components, software modules and/or processors running the software.

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of detecting an ensemble signal lock condition for signals received from a global navigation satellite system (GNSS), the method comprising:
    tracking a plurality of signals received from a respective plurality of satellites in the GNSS;
    calculating an individual frequency spectrum for each tracked signal in the plurality, to produce a plurality of individual frequency spectra, each individual frequency spectrum comprising a plurality of values;
    combining one or more values from several of the individual frequency spectra, to produce one or more combined values; and
    detecting the ensemble signal lock condition based at least in part on the one or more combined values.

2. The method of claim 1, wherein the one or more combined values comprise a plurality of combined values associated with respective frequencies, wherein detecting the ensemble signal lock condition comprises identifying the maximum value among the plurality of combined values and detecting the ensemble signal lock condition based at least in part on the maximum value.

3. The method of claim 1, wherein combining the one or more values comprises:
    identifying the maximum value in each of the several individual frequency spectra; and summing the identified maximum values to calculate a combined maximum value.

4. The method of claim 1, wherein the values in each individual frequency spectrum are associated with respective frequencies, and
wherein the method further comprises, for each individual frequency spectrum:
identifying a maximum value in the individual frequency spectrum; and
detecting an individual signal lock condition based on the identified maximum value.

5. The method of claim 1, further comprising:
calculating a position fix based on the plurality of signals, and
in response to detecting the ensemble signal lock condition, outputting the position fix.

6. The method of claim 1 wherein, in response to not detecting the ensemble signal lock condition suppressing output of a position fix.

7. The method of claim 1, further comprising, in response to not detecting the ensemble signal lock condition, controlling a GNSS receiver to re-acquire satellite signals.

8. The method of claim 1, further comprising:
calculating a PVT solution based on the plurality of signals; and
predicting tracking parameters for each of the plurality of signals based on the calculated PVT solution.

9. The method of claim 1, further comprising:
demodulating at least one signal of the plurality of signals to detect data bits; and
wiping off the detected data bits from the at least one signal,
wherein the individual frequency spectrum for the at least one signal is calculated after wiping off the detected data bits.

10. The method of claim 9, wherein the individual frequency spectrum for the at least one signal is calculated from a set of samples of the at least one signal, wherein the set of samples spans multiple detected data bits.

11. A non-transitory computer-readable storage medium comprising computer program code configured to cause one or more physical computing devices to perform all the steps of the method as claimed in claim 1 when said computer program is run on said one or more physical computing devices.

12. A measurement engine for a Global Navigation Satellite System (GNSS) receiver, configured to receive signals from a GNSS, wherein the measurement engine is configured to track a plurality of signals received from a respective plurality of satellites in the GNSS, the measurement engine comprising:
one or more frequency estimators, configured to calculate an individual frequency spectrum for each signal in the plurality, to produce a plurality of individual frequency spectra; and
an ensemble lock detector, configured to:
combine one or more values from several of the individual frequency spectra, to produce one or more combined values; and
detect an ensemble signal lock condition based at least in part on the one or more combined values.

13. The measurement engine of claim 12, further comprising:
a bit detection unit, configured to demodulate at least one signal of the plurality of signals to detect data bits; and
a multiplier, configured to wipe off the detected data bits from the at least one signal,
wherein the frequency estimator is configured to calculate the individual frequency spectrum for the at least one signal after the wipe-off of the detected data bits.

14. The measurement engine of claim 12, further comprising a code phase estimator, configured to estimate a code phase for at least one signal of the plurality of signals.

15. The measurement engine of claim 12, further comprising a channel lock detector for each of the plurality of signals, configured to detect an individual signal lock condition based on the respective individual frequency spectrum of the signal,
wherein the measurement engine is configured to exclude the respective signal from being used in the detection of the ensemble signal lock condition in response to not detecting the individual signal lock condition.

* * * * *